United States Patent [19]

Chlystek

[11] 4,053,439
[45] Oct. 11, 1977

[54] LOW-SMOKE GENERATING POLYURETHANE FOAM

[75] Inventor: Stanley J. Chlystek, Mountville, Pa.

[73] Assignee: Armstrong Cork Company, Lancaster, Pa.

[21] Appl. No.: 691,090

[22] Filed: May 28, 1976

[51] Int. Cl.$^2$ .............................................. C08G 18/22
[52] U.S. Cl. ......................... 260/2.5 AJ; 260/2.5 AB; 260/2.5 BB; 260/77.5 AB
[58] Field of Search .................... 260/2.5 AJ, 2.5 AC, 260/77.5 AB, 2.5 BB, 2.5 AB

[56] References Cited

U.S. PATENT DOCUMENTS

| 2,933,462 | 4/1960 | Fischer ........................... 260/2.5 AB |
| 3,108,975 | 10/1963 | Lambert et al. ............. 260/77.5 AB |
| 3,259,593 | 7/1966 | Eichhorn ........................ 260/2.5 AJ |
| 3,365,470 | 1/1968 | Schmerling ..................... 260/2.5 AJ |
| 3,509,104 | 4/1970 | Fuchsman et al. ........... 260/77.5 AB |
| 3,574,164 | 4/1971 | Cybo .............................. 260/2.5 AJ |
| 3,637,542 | 1/1972 | Doerge et al. ................. 260/2.5 AJ |
| 3,637,543 | 1/1972 | Kus et al. ....................... 260/2.5 AJ |
| 3,647,724 | 3/1972 | Doerge et al. ................. 260/2.5 AJ |
| 3,684,748 | 8/1972 | Barie, Jr. et al. .............. 260/2.5 AJ |
| 3,684,754 | 8/1972 | Barie, Jr. et al. .............. 260/2.5 AJ |
| 3,773,696 | 11/1973 | Papa et al. ..................... 260/2.5 AJ |

Primary Examiner—Eugene C. Rzucidlo
Attorney, Agent, or Firm—Richard J. Hammond

[57] ABSTRACT

A flame-retardant, low-smoke generating polyurethane foam composition having incorporated therein a flame retardant and smoke inhibiting amount of a composition comprising a halogen-containing organic compound and the metallic salt of a polyfunctional aromatic carboxylic acid free of acid functionality.

10 Claims, No Drawings

LOW-SMOKE GENERATING POLYURETHANE FOAM

BACKGROUND OF THE INVENTION

1. Field of the Invention

The present invention deals with a foamed polyurethane composition that is both flame retardant and low smoke generating. In one embodiment, the flame-retardant, low-smoke generating polyurethane foam is comprised of the condensation product of a polyisocyanate with a halogen-containing polyol and, having added thereto, the metallic salt of a polyfunctional aromatic carboxylic acid free of acid functionality.

2. Description of the Prior Art

Increasing attention has been placed on the flammability and the quantity of smoke generated from polyurethane foams. Methods to measure and rate such smoke generation have been promulgated, for example, as seen in ASTM-E84 Tunnel Test as well as in UL-723. Also see Journal Cellular Plastics, January 1967, pages 41 to 43. Flammability rates of such polyurethane foams have also been measured and one of the most acceptable standardized tests for such polymeric systems is ASTM-E84 (UL-723).

The use of certain additives for the purpose of reducing the flammability of polyurethane materials and polyurethane foams is well known to those skilled in the art. Among the wide variety of additives currently employed for such use are the various types of phosphorus-containing compounds. These phosphorus compounds are generally used either alone or in combination with other materials, such as organic or inorganic compounds of antimony or halogenated organic materials. The phosphorus-containing compounds may be non-reactive chemicals such as tris(2-chloroethyl)phosphate, tris(2,3-dibromopropyl)phosphate, ammonium phosphate or more complicated hydroxy compounds which are reacted into the foam structure. Similarly, a wide variety of halogen-containing polyols are also known to reduce flammability and flame retardancy when such are incorporated into the polyurethane polymer and, as in the case of the phosphorus compounds, such may also be of reactive or non-reactive type. Antimony trioxide is also used to reduce the flammability of urethanes, especially in combination with other materials such as the aforementioned halogenated organics and ammonium phosphate.

Flame retardant and thermally stable polyurethane materials have been disclosed that are formed from a mixture of a polyfunctional aromatic carboxylic acid, a polyol and a polyarylpolyisocyanate, for example, see U.S. Pat. No. 3,637,543. These modified polyurethanes have been described as generating much less smoke than prior art foams. In U.S. Pat. No. 3,684,748, it is disclosed that carboxylic acid anhydrides in combination with phosphorus-containing polyols form a synergistic combination of components that give effective flame retardancy. Aliphatic carboxylic acids are noted to inhibit flame spread in combination with polyether polyols and phosphorus-containing polyols, see for example U.S. Pat. No. 3,639,307.

One of the drawbacks of these known compounds and combinations of compounds, however, has been the fact that generally large amounts (up to 35%) of the additive must be incorporated into the urethane polymer in order to render it acceptably flame resistant and low smoke generating. Such large quantities of additives often have a deleterious effect upon the properties of the foam. Foams can be weakened and may show a tendency to shrink. Some additives tend to crystallize or migrate out of the foamed polymer after a relatively short time of incorporation therein. In many cases, the molecular integrity of the flame-resistant polymer is drammatically changed through the incorporation of flame-retardant compounds. This results in an overall degradation of both physical and chemical properties. In addition, the low-smoke generating carboxylic acid containing polyurethane foam compositions do not effectively cure in commercially attractive time periods because polymerization is substantially inhibited by the presence of these compounds. In many cases, no foam is produced or, at best, an extremely high density foam results.

SUMMARY OF THE INVENTION

It is one object of the present invention to provide a polyurethane composition that has both flame-retardant and low-smoke generating properties.

Another object of this invention is to provide a polyurethane foam composition that cures quickly at ambient temperatures and has both fire-retardant and low-smoke generating properties.

Another object of the present invention is to provide a polyurethane foam composition that cures readily at room temperatures and has optimum properties despite the presences of a smoke inhibiting aromatic carboxylic acid composition.

This and other objects of the present invention are accomplished by incorporating into a polyurethane foam composition a flame-retardant and low-smoke generating composition comprising halogen-containing polyol and the metallic salt of a polyfunctional aromatic carboxylic acid free of acid funtionality.

DESCRIPTION OF THE PREFERRED EMBODIMENTS

It has been discovered that a metallic salt of a polyfunctional aromatic carboxylic acid, when free of acid functionality, e.g., when all the carboxylic acid functional groups are reacted, and incorporated into a halogen-containing polyurethane foam, results in a fire-retardant and low-smoke generating foam composition.

The polyurethane foams of this invention, having reduced smoke generation, are virtually any fire-retardant foam formulation formed by reacting an organic polyisocyanate with an active hydrogen-containing material and containing a halogen fire retardant.

The organic polyisocyanates, which are reacted with the active hydrogen-containing materials to form the polyurethane foams of this invention, include the aromatic isocyanates, such as toluene diisocyanate, as well as the aliphatic isocyanates such as ethylene diisocyanate, 1,4-tetramethylene diisocyanate, hexamethylene diisocyanate, and the like. While the above diisocyanates may be reacted with the active hydrogen-containing material to form foams, it is preferred to form prepolymers of said diisocyanates when they are to be used in foam formulations.

Of the preferred polyisocyanates used in accordance with the present invention, the best results are obtained when the polymeric aryl polyisocyanates having a functionality greater than 2 and containing at least two aromatic rings are utilized. These rings are substituted with at least one isocyanato group. The aromatic rings may be suitably interconnected by one or more methylene, propylene, carbonyl, sulfoxide, sulfone or ether linkages. Isocyanate-substituted biphenyls are also suitable. The aromatic rings of any of the above compounds may be additionally substituted by ethyl, methyl, or propyl groups. Specific examples of suitable liquid polyarylpolyisocyanates for use with the invention include: polymethylene polyphenylisocyanates having from 2 to 10 benzene rings and liquid mixtures at room temperature of polymethylene polyphenylisocyanate with one or more of the following polyarylpolyisocyanates: 4,4'-diphenylmethylene diisocyanate; diphenylmethylene 3,3'-diisocyanate; diphenyl diisocyanate; diphenylsulfone diisocyanate; diphenylsulfide diisocyanate; diphenylsulfoxide diisocyanate; and diphenylpropane diisocyanate. Polymethylene polyphenylisocyanates having an average functionality of about 2.1 to 3.5 are particularly suitable isocyanates.

As an essential component used in making the fire-retardant and low-smoke generating polyurethanes of this invention is, as disclosed above, one or more halogen-containing materials such as halogen-containing polyols. These latter compounds form the active hydrogen material used in the reaction with the aforementioned organic polyisocyanates.

While the halogen which contributes to fire retardancy and facilitates the low smoke generation may be in the form of a reactive or a non-reactive halogen-containing compound, it is preferred that the halogen-containing compound be in the form of a compound containing active hydrogen groups such as a polyol, i.e. a reactive halogen-containing compound. The nature of the halogen-containing compound is, in fact, the nature of the active hydrogen compound. All such materials conventionally employed in the art may be employed in the foams of this invention. A great many halogen-containing materials which may be incorporated in the polyurethane foams to achieve fire retardancy are known in the art. These materials can be found, for example, in U.S. Patent Classification Class 260, subclass 2.5. To enumerate at length all the possible materials useful in this invention as having active hydrogen moieties is deemed unnecessary since one need merely refer to the art to determine what materials are available. The halogen-containing polyols include those derived from any of the halogens, such as fluorine, chlorine, bromine or iodine. The linear, long-chain, hydroxy-terminated halogenated polyesters are a particularly useful class of polyol and are produced by the reaction of adipic acid and diethylene glycol or a diethylene glycol with a minor proportion of glycerol, trimethylol ethane or other triols. For the purpose of the present invention, these hydroxy-terminated polyesters are modified by incorporating therein a halogenated bisphenolic glycol. This technique and the variety of halogenated bisphenolic glycols useful herein are described in U.S. Pat. No. 3,575,547. Among the halogenated bisphenol glycols found preferable for this purpose are 2,2-bis[3,5-dichloro-4)2-hydroxyethoxy)phenyl]-propane and 2,2-bis[3,5-dibromo-4(2-hydroxypropoxy)phenyl]-propane. Aliphatic halogen-containing polyols are also useful and may be used in place of the aforementioned aromatic halogen-containing polyols. Low molecular weight polyols such as 1,2,5,6-tetrabromo-3,4-dihydroxyhexane, such as is disclosed in U.S. Pat. No. 3,779,953, can also be employed. High molecular weight diols are also useful such as the halogenated aliphatic ether diols as described in U.S. Pat. No. 3,773,696.

Those halogen-containing, non-reactive compounds for use in accordance with the present invention include the halogenated paraffins; halogenated polyolefins; halogenated biphenyls; halogenated bisphenols; halogenated cyclopentadienes; and dicyclopentadienes such as perchloropentacyclodecane, tetrabromobutene-2, hexachlorocyclohexene and pentabromoethylbenzene.

In addition to the above-mentioned halogen-containing compounds, other polyols can be used as active hydrogen materials to form the polyurethane foams of this reaction.

Phosphorus-containing polyols may be used in addition to the halogen-containing polyols disclosed above in the foams of this invention. These materials are found listed in U.S. Patent Classification Class 260, subclass 2.5. The phosphorus-containing polyols include those derived from phosphorus, phosphoric and pyrophosphoric acids. The polyols of these acids may be prepared in a number of ways such as reacting the acids with alkylene oxides, or halogen-substituted alkylene oxides or by esterification of the acids or transesterification of the acid esters with polyalkylene glycols or polyoxyalkylene glycols. One particular useful class of phosphorous-containing polyol is the product of the oxyalkylation of an acid ester formed from an oxyacid of phosphorus in a monohydric alcohol as described in U.S. Pat. No. 3,407,150. Other polyols which may be employed include tris(polyalkyleneglycol) phosphites such as tris(dipropyleneglycol) phosphite, phosphoric acidpropylene oxide adducts and dialkyl dialkanolaminoalkylphosphonates, such as is described in U.S. Pat. No. 3,684,754.

Non-reactive phosphorus-retardant agents for incorporation herein include tris(chloroethyl)phosphate, tris(chloropropyl)phosphate, tris(2,3-dichloropropyl)phosphate, tris(2,3-dibromopropyl)phosphate, bis(beta-chloroethyl)vinyl phosphate.

The common polyether polyols, polyester polyols and the like are economically used with the active hydrogen compounds containing halogen. These include the following or mixtures of the following polyols: poly(oxypropylene) adducts of trimethylolpropane, poly(oxypropylene) adducts of 1,2,6-hexanetriol, propylene oxide adducts of pentaerythritol, poly(oxpropylene)-poly(oxethylene) adducts of ethylenediamine block copolymers, poly(oxpropylene) adducts of sorbitol, polypropylene oxide adducts of sucrose, polypropylene oxide adducts of alphamethyl glucoside, polypropylene oxide adducts of ethylenediamine, polypropylene oxide adducts of trimethylolpropane. The polyester polyols useful in this process are the reaction products of dibasic or tribasic acids, alcohols or polyhydroxy alcohols and acids. Representative polyesters useful in this process are the reaction product of isophthalic acid, succinic acid, tetrahydrophthalic acid, pimelic acid and fumaric acid, as well as polyhydroxy alcohols. Some useful alcohols include ethylene glycol, propylene glycol, butylene glycol, diethylene glycol, dipropylene glycol, tetraethylene glycol, pentaerythritol and sorbitol. All of these polyols have free hydroxy groups which make them useful in this reaction. The resulting polyester polyols have available for reaction at least three hydroxy groups. Polyalkylene-glycols having less than three hydroxy groups per mole are useful as diluents when used in conjunction with the polyols having three or more hydroxy groups. The only qualification to these polyols is that they should have at least three hydroxy groups or an average of three hydroxyl groups per mole. Similarly, the molecular weight of the polyol should not exceed 2,000. When polyols having a molecular weight in excess of 2,000 are used, the resulting foams tend to lose their flame resistance. Unlike the conventional urethane stoichiometry, the amount of these organic polyols added can vary widely and be as low as 5% to 10% by weight based on total formula for this process. These organic polyols are disclosed in U.S. Pat. No. 3,647,724, which is incorporated herein by reference.

The equivalent ratio of the total polyol:polyisocyanate can vary from 1:0.9 to 1:1.3. Advantageously, an equivalent ratio of polyol:polyisocyanate of 1:1.05 is used.

While in some cases it is preferable to utilize only halogen-containing polyols in these polyurethane compositions, lower formulation costs can be achieved if such polyols are mixed with nonhalogenated polyols such as disclosed above. As such, ratios of halogen-containing polyol:organic polyol are from 1:0 to 1:1, preferably 4:1.

As an essential component to promote the quick-gelling, low smoke generation of the aforementioned polyurethane material, it is necessary to add thereto a metallic salt of a polyfunctional aromatic carboxylic acid that is free of acid functionality. The aromatic carboxylates have the following formulas:

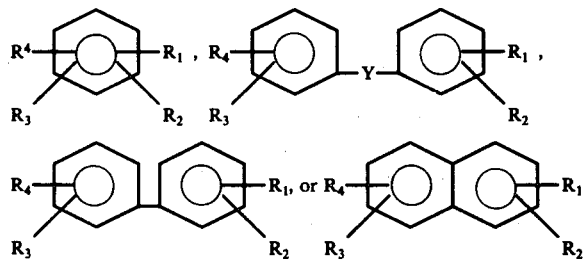

wherein $R_1$ is metal carboxylate and $R_2$, $R_3$ and $R_4$ are independently selected from the group consisting essentially of hydrogen and carboxylate with at least one being carboxylate and Y is a bridging group selected from the group consisting of $C_1$-$C_6$ alkylene, carbonyl, sulfonyl and oxygen. These metal carboxylates are easily prepared by the reaction of an appropriate metal salt with a polyfunctional aromatic carboxylic acid, anhydride or acid chloride. Illustrative of polyfunctional aromatic carboxylic acids and acid halides useful in this invention are trimetallitic acid, trimellitic acid chloride, pyromellitic monoanhydride, pyromellitic acid, terephthalic acid, 1,3,3-trimethyl-1-phenylindan-4',6-dicarboxylic acid, isophthalic acid, trimesic acid, 3,4,3'-4'-tetracarboxylbenzophenone, 3,4,3'-tricarboxylbenzophenone, 4,4'-carboxybenzophenone, the aryl halides of 3,4,3',4' and 3,',4,3' and 4,4'-tetracarboxybenzophenones, and the monoanhydride of 3,4,3',3'-tetracarboxybenzophenone.

Illustrative of the anhydride reactants which may be used are:
hemimellitic anhydride,
pyromellitic dianhydride,
1,2,3,4-benzenetetracarboxylic dianhydride,
3,3',4,4'-benzophenonetetracarboxylic dianhydride,
4'-carboxy diphenyl-3,4-dicarboxylic anhydride,
diphenyl-3,3',4,4'-tetracarboxylic dianhydride,
diphenyl-2,2',3,3'-tetracarboxylic dianhydride,
naphthalene-2,3,6,7-tetracarboxylic dianhydride,
naphthalene-1,2,5,6-tetracarboxylic dianhydride,
naphthalene-1,2,4,5-tetracarboxylic dianhydride,
naphthalene-1,4,5,8-tetracarboxylic dianhydride,
aminonaphthalene-1,8-dicarboxylic anhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,3,9,10-tetracarboxylic dianhydride,
bis(2,3-dicarboxyphenyl)methane dianhydride,
bis(3,4-dicarboxyphenyl)methane dianhydride,
1,1-bis(3,4-dicarboxyphenyl)ethane dianhydride,
2,2-bis(2,3-dicarboxyphenyl)propane dianhydride,
2,2-bis(3,4-dicarboxyphenyl)propane dianhydride,
bis(3,4-dicarboxyphenyl)sulfone dianhydride, and
bis(3,4-dicarboxyphenyl)ether dianhydride.

Any of the above aromatic carboxylic acids, halides, anhydrides or mixtures thereof can be reacted with metallic salts to form the metallic salt of the polyfunctional aromatic carboxylic acid free of acid functionality. The term metallic salt used herein refers to a compound formed between a metallic radical and one or more radicals of the aromatic carboxylic acids, acid anhydrides or acid halides disclosed above. These are more particularly described as metal carboxylates and are well known in the prior art. These materials are most readily obtained by the reaction of a solution of metal acetate, nitrate, sulfate, or chloride with the aromatic carboxy-containing compound, the metal carboxylate precipitating out from the solution. Water is the most preferred solvent for such reaction, but dimethylformamide, dimethylsulfoxide and the other dipolar aprotic solvents can also be used. When water is used as a solvent, a stoichiometric amount of aromatic carboxy-containing compound and metal salt are preferably employed.

The metal radical in accordance with the present invention can be any of those radicals capable of reacting with the carboxylic acid groups of the aromatic carboxy-containing compounds disclosed above and are electropositive with respect to such carboxylic acids. Illustrative of the electropositive metal radicals, generally described as A, used for forming the metal carboxylates in accordance with the present invention are the following metal (valence) selected from the group consisting of: Lithium (I), cesium (I), rubidium (I), potassium (I), barium (II), strontium (II), calcium (II), sodium (I), lanthanum (III), magnesium (II), thorium (IV), beryllium (II), hafnium (IV), aluminum (III), zirconium (IV), manganese (II), manganese (III), titanium (IV), zinc (II), boron (III), antimony (III), tantalum (V), chromium (III), chromium (IV), iron (II), iron (III), cobalt (II), cobalt (III), nickel (II), nickel (IV), tin (II), tin (IV), lead (II), copper (II), copper (I), mercury (I), mercury (II), preferably, those salts of manganese (II), copper (II), zinc (II) and iron (III).

The metallic polyfunctional aromatic carboxylates useful as smoke inhibiting and flame retardant agents in accordance with the present invention are compounds of the formula $[R(CO_2)_n]_m A$ where R is

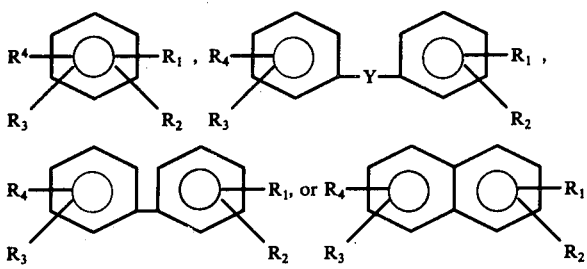

and $R_1$, $R_2$, $R_3$, and $R_4$ are as previously disclosed; A is the metal radical as previously disclosed; $n$ is 2, 3, or 4; and $m$ is $\frac{1}{2}$, 1, 2, 3, or 4.

In order to assure rapid foaming and maximization of foam properties, it is preferable to react all carboxyl functions in the aromatic carboxyl-containing compound with the metallic salt to form the metal carboxylates. In some cases, however, it is preferable to have available some free acid functionality and, as such, the compounds useful in accordance with the present invention may be metal carboxylates with free acid functionality, i.e. monozinc trimellitic acid. Both physical and molecular mixtures of these metallic salts of polyfunctional aromatic carboxylic acids can also be used in the flame retardant, low smoke generating polyurethanes.

Illustrative of a molecularly mixed metallic salt of an aromatic polyfunctional carboxylic acid is zinc-cupric benzenetricarboxylate.

The polyurethane foams are prepared in the presence of a foaming agent. The foaming agent employed may be any of those known to be useful for this purpose, such as water, and the organic foaming agents containing up to about seven carbon atoms such as the halogenated hydrocarbons, lower molecular weight alkanes, alkenes, ethers, and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. The preferred foaming agents are the fluorocarbons boiling in the range of 20° to about 56° C. and mixtures thereof. These halogenated hydrocarbons may be employed in an amount of from 1 to 50 parts by weight per 100 parts by weight of active hydrogen compound. When water is employed, it is used in an amount of from about 10 to 60 parts by weight per 100 parts by weight of the active hydrogen-containing compound.

The polyurethane foams are prepared in the presence of a catalytic amount of a reaction catalyst. The catalyst employed may be any of the catalysts known to be useful for this purpose, or mixtures thereof, tertiary amines and metallic salts, particularly stannous salts. Typical tertiary amines include, but are not limited to, the following: N-ethyl morpholine, N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a catalyst mixture comprising N-ethyl morpholine is employed. The other components of the catalyst mixture are preferably another amine and a metallic salt. The catalyst or catalyst mixture, as the case may be, is usually employed in an amount ranging between about 0.1 and about 3.0 percent, preferably between about 0.5 and about 2.5 percent, by weight of the active hydrogen-containing compound.

It is preferred in the preparation of the polyurethane foams of the present invention to employ minor amounts of a conventional surfactant in order to further improve the cell structure of the polyurethane foam. Typical of such surfactants are the silicone oils and soaps, and the siloxaneoxyalkylene block copolymers. U.S. Pat. No. 2,834,748 and T. H. Ferrigno, Rigid Plastic Foams (New York): Reinhold Publishing Corp., 1963), pp. 38–42, disclose various surfactants which are useful for this purpose. Generally up to 2 parts by weight of the surfactant are employed per 100 parts by weight of active hydrogen-containing compound.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may also be added for strength. In addition, plasticizers, deodorants and antioxidants may be added.

The polyarylpolyisocyanate compounds are advantageously used in a well-known "one shot" system, wherein they are stored separately from the polyols, including the halogen-containing polyol and the metallic salt of the aromatic polycarboxylic acid and other materials until the foam is to be formed. The polyisocyanate component is then added to the other components which may, if preferred, be made up into a preformed master batch mix to which the polyisocyanate is added as rapidly as practicable. The mixture is then allowed to foam and cure. Alternatively, a mixture of the metal carboxylate and polyisocyanate may be formed, then added, as rigidly as possible, to the polyol mixture and allowed to foam and cure.

The following examples set forth presently preferred embodiments. They are included as illustrations of the preparation of the flame-retardant and low-smoke generating polyurethane foam of this invention and are not intended as limitations thereof.

The amount of metal carboxylates used in the polyurethane compositions in accordance with the present invention depends on the quantity of halogen as halogen-containing material present in the formulation. As such, the ratio is determined by considering the amount of total halogen available in the foam formula, whether present from reactive halogen-containing polyol or non-reactive halogen-containing additive. Typically, the ratio of total halogen:metallic salt of a polyfunctional aromatic carboxylic acid is 1:4 to 1:1, most preferably 3:4.

In addition to serving as a smoke-inhibiting component of this foam composition, the metallic salts of the polyfunctional aromatic polycarboxylic acids also serves to catalyze the isocyanate/alcohol reaction.

It is understood that the invention can be practiced otherwise than in the aforementioned examples.

The metal salts of aromatic carboxylates are well known in the prior art. The example typifies the technique for obtaining the organic metal salt.

EXAMPLE 1

In boiling water, approximately 1 equivalent (123 g) of $Mn(C_2H_3O_2)_2 \cdot 4H_2O$ (manganese acetate tetrahydrate) is dissolved. Slightly less than 1 equivalent of trimellitic anhydride (TMA) is added gradually with stirring to the boiling solution. As the salt of trimellitic acid starts to form it begins to precipitate from the boiling solution. The mixture was removed from heat and allowed to cool. The precipitated off-white manganese trimellitate is filtered, dried and powdered for subsequent use in foam preparations.

EXAMPLES 2–11

A master batch of the following reagents was compounded:

| Ingredient | Parts |
| --- | --- |
| Polyester modified polyol[1] | 56 |
| Tetraethylene glycol - equivalent weight 97.12 | 14 |
| Trichlorofluoromethane | 30 |

[1]A propylene oxide/sucrose adduct coupled with tetrabromo phthalic anhydride and triethylamine of hydroxyl number 290–300 and containing 27.27% bromine and 0.24% nitrogen.

This master batch was admixed with the components of Table I to give foamed polyurethanes as illustrated in the following:

Table I

| | Foam Formulations | | | | | | | | | |
| --- | --- | --- | --- | --- | --- | --- | --- | --- | --- | --- |
| Ingredients (g) | 2 | 3 | 4 | 5 | 6 | 7 | 8 | 9 | 10 | 11 |
| PAPI[1] | 47 | 47 | 47 | 47 | 47 | 47 | 47 | 47 | 47 | 47 |
| Trimellitic Anhydride | 23.5 | — | 13.5 | — | 13.5 | 23.5 | — | 3.5 | 3.5 | 3.5 |
| Silicone Surfactant[2] | 2 | 2 | 2 | 2 | 2 | 2 | 2 | 2 | 2 | 2 |
| Master Batch | 64 | 64 | 64 | 64 | 64 | 64 | 64 | 64 | 64 | 64 |
| Catalyst I[3] | 1 | 1 | 1 | 0.5 | 1 | 1 | 0.2 | 1 | .5 | 1 |
| Catalyst II[4] | 1 | 1 | 1 | 0.5 | 1 | 1 | 0.4 | 1 | .5 | 1 |
| Tetramethylbutane diamine | 2 | — | — | — | — | 2 | — | — | — | — |
| Mn++trimellitate | — | 35.3 | 15 | — | — | — | — | — | — | 30 |
| Cu++trimellitate | — | — | — | 36.9 | 15.7 | — | — | 31.4 | 31.4 | — |
| Gel Time | 2'24" | 38" | 3'30" | 28" | 3'15" | 2'22" | 53" | 1'24" | 2'6" | 2'22" |
| Tack Free Time | 2'28" | Fast | 3'39" | Fast | 3'21" | 2'28" | 57" | 1'30" | 2'11" | 2'30" |
| Visual Smoke Rating (1 best, 9 worst) | 3 | 1 | 5 | 5 | 6 | 4 | 9 | 7 | 8 | 2 |

NOTE: Smoke evolved was judged visually from the observation of 1" cubes of foam held in a Bunsen burner flame.
[1]A polymethylene polyphenylisocyanate having an isocyanate equivalent of about 133.5, NCO content availability of 32% and a viscosity of 250 cps/25° C.
[2]A polysiloxane-polyoxyalkylene block copolymer used as a foam stabilizer or surfactant.
[3]Dibutyltin dilaurate
[4]1,4-diaza-2,2-bicyclooctane

EXAMPLE 12

Foam With TMA Added (Comparison)

A mixture of 50 grams of powdered trimellitic anhydride (TMA) with 100 g of PAPI was formed (see Table I for identification of components).

70.5 g of this mixture (A side) was added to the mixture (B side) below.

| Master batch | 64 g |
| --- | --- |
| DC 113 Silicone fluid | 1 g |
| Catalyst I | 1 g |
| Catalyst II | 1 g |
| Diethanolamine | 1 g |

After mixing A + B for 10 seconds, it was observed that the resulting foam was slow to rise and slow to reach the tack-free state.

EXAMPLE 13

Foam Without TMA Addition (Comparison)

47 g of PAPI (A side) was added to the same mixture of B side components as shown in Example 12 above, and mixed as before. This time, the resulting foam was produced with a rapid rise time and much more rapid time to tack-free state than in Example 12.

The above table and comparisons disclose that the metallic salts of the polyfunctional aromatic carboxylates permit rapid urethane reaction and foam formation with conventional catalysts, giving foams of good fire retardancy and low smoke evolution, whereas conventional fire-retardant, low-smoke agents (trimellitic anhydride) inhibit foaming (gel time) and give extended periods of tack-free time.

EXAMPLES 14–19

The master batch of Examples 2–11 was admixed with the components of Table II to give foamed polyurethanes as illustrated below.

EXAMPLES 14–19

Table II

| | Foam Formulations | | | | | |
| --- | --- | --- | --- | --- | --- | --- |
| Ingredients (g)[1] | 14 | 15 | 16 | 17 | 18 | 19 |
| Master batch | 64 | 64 | 64 | 64 | 64 | — |
| PAPI | 47 | 47 | 47 | 47 | 47 | 47 |
| Mn++Trimellitate | 35.3 | — | — | 35.5 | — | — |
| Zn++Trimellitate | — | 37.3 | 37.3 | — | — | — |
| Fe+++Trimellitate[2] | — | — | — | — | 32.2 | — |
| Fe+++Trimellitate[3] | — | — | — | — | — | 23.5 |
| Polyol blend[4] | — | — | — | — | — | 70.7 |
| Silicone Surfactant | 2.0 | 2.0 | 2.0 | 2.0 | 2.0 | 1.0 |
| Catalyst I | — | 0.5 | — | 0.3 | 0.3 | 0.1 |
| Catalyst II | — | 0.5 | — | 0.3 | 0.3 | 0.1 |
| Dimethylethanolamine catalyst | — | — | — | — | 0.3 | 0.5 |
| Gel Time | V. slow | 25" | Slow | 38" | 5'20" | 1'12" |
| Tack Free Time | V. slow | V. fast | V. slow | 43" | 5'26" | 1'15" |

[1]See Examples 2–11
[2]Iron salt not neutralized (free carboxylic acid present)
[3]Iron salt (no free carboxylic acid present)
[4]Equal parts of master batch, tetraethylene glycol and the di-beta-hydroxyethyl ether of hydroquinone.

From this table, the importance of utilizing metallic salts of aromatic polycarboxylates having no free carboxylic acid is depicted.

Table III

| Standard Smoke Test (ASTM-D-2843-70) | | | |
| --- | --- | --- | --- |
| Foam Example (Table I) | Avg. % Smoke | Avg. SV/g | Gel Time (sec.) |
| 8 | 84 | 154 | 53 |
| 2 | 45 | 90 | 144 |
| 3 | 59 | 81 | 38 |
| 5 | 40 | 69 | 25 |
| 6 | 58 | 97 | 28 |

Table III supports the empirical results of Table I, disclosing the greatly lowered smoke from polyurethane formulations having incorporated the metallic salts of polyfunctional aromatic carboxylic acids in accordance with the present invention.

The following examples were produced from foams resulting from the admixtures of

|  | Parts |
|---|---|
| The trichloro-1,2-expoybutane adduct of sucrose of equivalent weight 150 | 80 |
| Polylactone polyol of equivalent weight 180 | 20 |
| Trichlorofluoromethane | 30 |

137 g with 2 grams each of the surfactant and catalyst of Table II.

This was mixed with 50 grams of trimellitic anhydride or the manganous salt of trimellitic acid and 100 grams of PAPI. The NCO/OH ratio was 1.05/1.0 and the rigid foam produced had a free rise density of 1.92 pcf.

EXAMPLES 20–22

Table IV

|  | Flaming (Dm Corr) | NBS Flame Test Smoldering (Dm Corr) | Gel Times (Sec.) |
|---|---|---|---|
| No additives | 100–110 | 90–100 | 30 |
| PAPI + Trimellitic anhydride | 70–80 | 64 | 120 |
| PAPI + Manganous salt of trimellitic carboxylic acid | 93 | 70 | 30–40 |

What is claimed is:

1. A flame-retardant, smoke-inhibited polyurethane foam having incorporated therein a flame-retardant and smoke-inhibiting composition comprising in combination a halogen-containing, fire-retardant organic material in an amount sufficient to render the final foam selfextinguishing and a smoke-inhibiting amount of at least one metallic salt of an organic polycarboxylic acid free of acid functionality of the formula $[R(CO_2)_n]_m A$ wherein R is

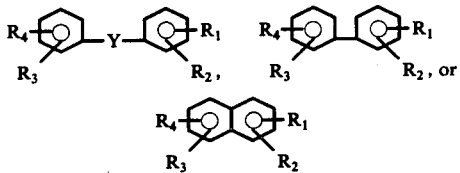

wherein $R_1$ is carboxylate and $R_2$, $R_3$ and $R_4$ are independently selected from the group consisting essentially of hydrogen and carboxylate with at least one being carboxylate and Y is a bridging group selected from the group consisting of $C_1$-$C_6$ alkylene, carbonyl, sulfonyl and oxygen; A is a metal selected from the Periodic Table Group, I, II, III or IV; $n$ is b 2, 3, or 4; and $m$ is 1/2, 1, 2, 3, or 4.

2. A flame-retardant, smoke-inhibited polyurethane foam in accordance with claim 1 wherein the ratio of total halogen:metallic salt of a polyfunctional aromatic carboxylic acid is 1:4 to 1:1.

3. A flame-retardant, smoke-inhibited polyurethane foam having incorporated therein a flame-retardant and smoke-inhibiting composition comprising in combination a halogen-containing, fire-retardant organic material in an amount sufficient to render the final foam selfextinguishing and a smoke-inhibiting amount of at least one metallic salt of acid functionality of the formula $[R(CO_2)_n]_m A$ wherein R is

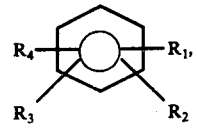

wherein $R_1$ and $R_2$ are carboxylate and $R_3$ and $R_4$ are independently selected from the group consisting essentially of hydrogen and carboxylate with at least one being carboxylate; A is a metal selected from the Periodic Table Group I, II, III or IV; $n$ is 2, 3, or 4; and $m$ is ½, 1, 2, 3, or 4.

4. A flame-retardant, smoke-inhibited polyurethane foam in accordance with claim 3 wherein R is a benzene-1,2,4-tricarboxylate radical and A is selected from the group consisting of manganous, ferric, cupric and zinc.

5. A flame-retardant, smoke-inhibited polyurethane foam in accordance with claim 3 wherein , $[R(CO_2)_n]_m A$ is manganous benzene-1,2,4-tricarboxylate.

6. A flame-retardant, smoke-inhibited polyurethane foam in accordance with claim 3 wherein the ratio of total halogen:metallic salt of an aromatic polycarboxylic acid free functionality is 1:4 to 1:1.

7. The flame-retardant, smoke-inhibited polyurethane foam of claim 3 incorporating 10% to 25% by weight of total composition of said metallic salt of an aromatic polycarboxylic acid free of acid functionality.

8. A process for producing flame-retardant, smoke-inhibited polyurethane foam which comprises reacting at ambient temperatures and without the addition of external heat or pressure to the reaction system
   a. at least one metallic salt of an aromatic polycarboxylic acid free of acid functionality of the formula , $[R(CO_2)_n]_m A$ wherein R is

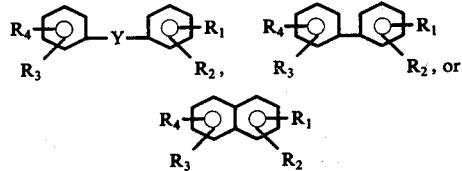

wherein $R_1$ is carboxylate and $R_2$, $R_3$ and $R_4$ are independently selected from the group consisting essentially of hydrogen and carboxylate with at least one being carboxylate and Y is a bridging group selected from the group consisting of $C_1C_6$ alkylene, carbonyl, sulfonyl and oxygen; A is a metal selected from the Periodic Table Group I, II, III, or IV; $n$ is 2, 3, or 4; and $m$ is ½, 1, 2, 3, or 4;

b. a polymeric aryl polyisocyanate having a functionality greater than 2 and containing at least two aromatic rings, said aromatic rings substituted with at least one isocyanato group; and c. a polyol composition formed from the mixture of an organic polyol of a molecular weight less than 2000 and having at least three hydroxyl groups per molecule and an organic halogen-containing polyol wherein the ratio of said organic polyol-organic halogen-containing polyol is 0:1 to 1:1 and the ratio of NCO:OH in said reaction system is 0.9:1 to 1.05:1.

9. A process for producing a flame-retardant, smoke-inhibited polyurethane foam having incorporated therein a flame-retardant and smoke-inhibiting composition comprising in combination a halogen-containing, fire-retardant organic material in an amount sufficient to render the final foam self-extinguishing and a smoke-inhibiting amount of at least one metallic salt of acid functionality of the formula $$[R(CO_2)_n]_m A$$

wherein R is

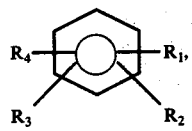

wherein $R_1$ and $R_2$ are carboxylate and $R_3$ and $R_4$ are independently selected from the group consisting essentially of hydrogen and carboxylate with at least one being carboxylate; A is a metal selected from the Periodic Table Group I, II, III or IV; $n$ is 2, 3, or 4; and $m$ is ½, 1, 2, 3, or 4.

10. The process of claim 9 wherein R is a benzene-1,2,4 tricarboxylate radical and A is selected from the group consisting of manganous, ferric, cupric and zinc.

* * * * *